Feb. 26, 1929.
C. VAN BRUNT
1,703,646
OIL CLARIFICATION
Filed June 23, 1924
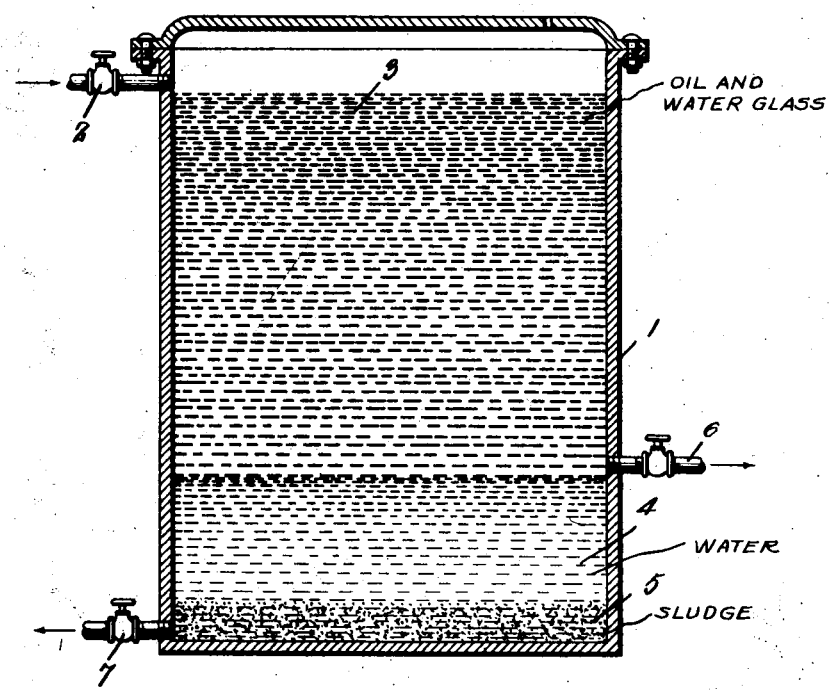
Inventor:
Charles Van Brunt,
by
His Attorney.

Patented Feb. 26, 1929.

1,703,646

UNITED STATES PATENT OFFICE.

CHARLES VAN BRUNT, OF SCHENECTADY, NEW YORK, ASSIGNOR TO GENERAL ELECTRIC COMPANY, A CORPORATION OF NEW YORK.

OIL CLARIFICATION.

Application filed June 23, 1924. Serial No. 721,609.

The present application relates to the treatment of a liquid petroleum product containing suspended matter, for example, spent lubricating oil from an automobile crank case, and its object is to improve the efficiency of the clarifying process and to provide a method whereby the recovered oil may be rendered clear and brilliant.

In my application Ser. No. 746,640, filed Oct. 29, 1924, I have described a method whereby a suspended solid matter in mineral, lubricating oil may be removed by mixing the oil with an aqueous solution of water glass. The water glass acts as an agglomerating agent and in some ways modifies the solid matter so that it may readily become wetted and removed by subsidence in water.

In another application Ser. No. 696,655, filed March 3, 1924, I have described and claimed an additional treatment whereby this process is improved and accelerated, namely the addition to the oil of a resinous material, such as ordinary rosin. Although the addition of a small amount of rosin renders dirty oil more responsive to the agglomerating action of the water glass, I have found as a result of further experiments that the characteristics of used lubricating oil vary considerably and that in some cases dirty oil is less susceptible to the action of rosin than in others.

In accordance with my present invention I have provided a treating agent which is markedly superior in its effect upon the oil to rosin and which comprises resinates of heavy metals preferably manganese resinate. As will be more fully explained hereinafter a small amount of resinate is added to the oil preliminary to its treatment with water glass.

The accompanying drawing is a vertical section of a clarifying tank which may be used in the practice of my invention.

Two features are of importance in the clarification of oil by means of the water glass process, namely the rate of subsidence of the solid matter and second the completeness of clarification of the oil. In the absence of a resinous material some lubricating oil required as long as twelve hours' time to complete subsidence of the suspended solid matter into a body of water from oil admixed with water glass, whereas other samples of oil would become cleared of suspended solid matter in less than half an hour. Turbidity of the cleaned oil is undesirable as in some cases the turbidity may be due to finely divided water glass remaining in the oil. Although this residue of suspended water glass may be removed by the subsequent flow of the oil over the heated surface in a rectifier, whereby gasoline and other diluents are removed, and hence does not injure the final product, nevertheless, turbidity due to suspended water glass is undesirable as the water glass suspension is apt to cause clogging of the fine bore distributor tubes in the rectifier and sometimes the formation of a deposit on the heated rectifier surface. It is therefore desirable that the clarification process be carried out both speedily and with the greatest possible degree of completeness.

Although manganese resinate is preferred for the purpose of my invention, resinates of other heavy metals may be used, as for example, a resinate of copper, zinc or lead. The resinate is introduced into the oil to be clarified either as a solution in benzol or other suitable solvent, or as a solution in oil. The latter may be prepared by heating and stirring the resinate in contact with mineral oil. This preliminary solution of a resinate in an oil will save time as a solid introduced directly into the cold oil to be clarified would dissolve too slowly to be practicable for commercial purposes. The resinate may be prepared by melting together rosin and a metallic oxide, as for example manganese dioxide, or it may be purchased in the open market. Preferably the resinate is introduced as a 20% benzol or oil solution, which is so proportioned with respect to the volume of the oil that a fractional per cent of resinate is introduced, for example, about one part by weight of the resinate to 200 parts of the dirty oil. In many cases a lesser proportion will suffice. As already described in my prior application Ser. No. 696,655 I prefer to introduce with the resinate a small amount of a saponifiable fatty acid, such as stearic acid. About $\frac{1}{10}$ of 1% by weight of the oil or less may be used with the proportion of resinate above indicated. In general this proportion should be preserved. The benzol solution of resinate and stearic acid is distributed throughout the oil by stirring. Then water glass in suitable amounts is added say from about 1 to 4 ounces of a concentration of 40° Bé. to one gallon of oil, constituting about one to three per cent of water glass by weight.

Upon thorough mixture of the water glass with the oil, the mixture is brought into contact with water, for example by introducing the mixture into a tank 1, through an inlet tube 2, and floating the impure oil 3, upon a body of water 4, which is heated to about 80° C., thereby causing the solid matter to subside into the water from the oil, forming a sludge layer 5, in the tank. The purified oil finally is removed by an outlet tube 6. The sludge may be drawn off from time to time by an outlet cock 7, fresh water being supplied through the inlet cock 2. This relatively simple settling apparatus advantageously may be replaced by a continuously operating counter current apparatus, as described in my prior application Ser. No. 696,655.

The amount of silicate specified above has an alkali value several times in excess of the resinate and stearic acid added. The latter are decomposed by the alkali, forming sodium soaps of the acids, and a hydroxide of manganese or whatever base may be present. Both compounds are insoluble in the oil and are completely removed by the water glass as part of the sludge. Thus no part of any of the clarifying reagents remain in the oil and hence the oil may be reclaimed or purified on successive occasions after having again been used without any accumulation of detrimental substance in the oil. When benzol is used as a vehicle for introducing the resinate, it is entirely removed by the subsequent action of the rectifier in which all readily volatile ingredients are vaporized.

What I claim as new and desire to secure by Letters Patent of the United States, is:

1. The process of eliminating finely divided solid matter from mineral oil which consists in adding an oil-soluble resinate of a heavy metal to said oil and then treating said oil with an aqueous solution of an alkaline agglomerating agent.

2. The preliminary step in the process of removing suspended solid matter from spent lubricating mineral oil by the action of an agglomerant which consists in dissolving a resinate of a heavy metal in said oil.

3. The preliminary step in the process of removing suspended solid matter from mineral oil by the action of an aqueous water glass solution which consists in dissolving a resinate of a heavy metal in said oil.

4. The method of clarifying a contaminated used mineral oil which consists in adding thereto a fractional per cent of manganese resinate, thereupon agglomerating the contaminating matter with water glass, and then removing the resulting sludge.

5. The method of removing suspended solid matter from used crank case oil which consists in adding a solution of manganese resinate to said oil in the proportion by weight of about one part of resinate to 200 parts of oil, then agglomerating said solid matter with water glass, and finally removing the solid matter by subsidence in water.

6. The preliminary step in the method of clarifying spent mineral lubricating oil by the agglomerating action of water glass, which consists in adding manganese resinate and stearic acid to the oil to be purified.

7. The method of removing suspended solid matter from used crank case oil, which consists in adding to said oil a small portion of manganese resinate, then adding a larger proportion of concentrated water glass solution, distributing the water glass in the oil as fine droplets, and bringing the resulting mixture into contact with water.

In witness whereof, I have hereunto set my hand this 21st day of June, 1924.

CHARLES VAN BRUNT.